United States Patent [19]

Lazzarini

[11] 3,848,498

[45] Nov. 19, 1974

[54] ROTARY SLICER FOR FRUITS AND VEGETABLES

[75] Inventor: Louis P. Lazzarini, San Jose, Calif.

[73] Assignees: Genevieve I. Hanscom; Robert Magnuson; Louis J. Thompson, ; Trustees of the Estate of Roy M. Magnuson, part interest to each

[22] Filed: May 18, 1973

[21] Appl. No.: 361,767

[52] U.S. Cl.................... 83/401, 83/412, 83/433, 83/676
[51] Int. Cl............................................. B26d 7/06
[58] Field of Search ....... 83/401, 412, 425.3, 425.4, 83/432, 433, 435.2, 676, 404.1, 472, 473

[56] References Cited
UNITED STATES PATENTS

| 2,021,300 | 11/1935 | Gardner.......................... 83/425.4 X |
| 2,051,256 | 8/1936 | Hilke .............................. 83/435.2 X |
| 3,124,183 | 3/1964 | McLauchlan...................... 83/425.3 |

*Primary Examiner*—Willie G. Abercrombie
*Attorney, Agent, or Firm*—Gerald L. Moore

[57] ABSTRACT

A rotary slicer for slicing into segments produce such as fruits and vegetables in which the article is advanced into the apex of a plurality of radially positioned power-driven disc blades so as to cut the article into segments of a predetermined size and number.

7 Claims, 4 Drawing Figures

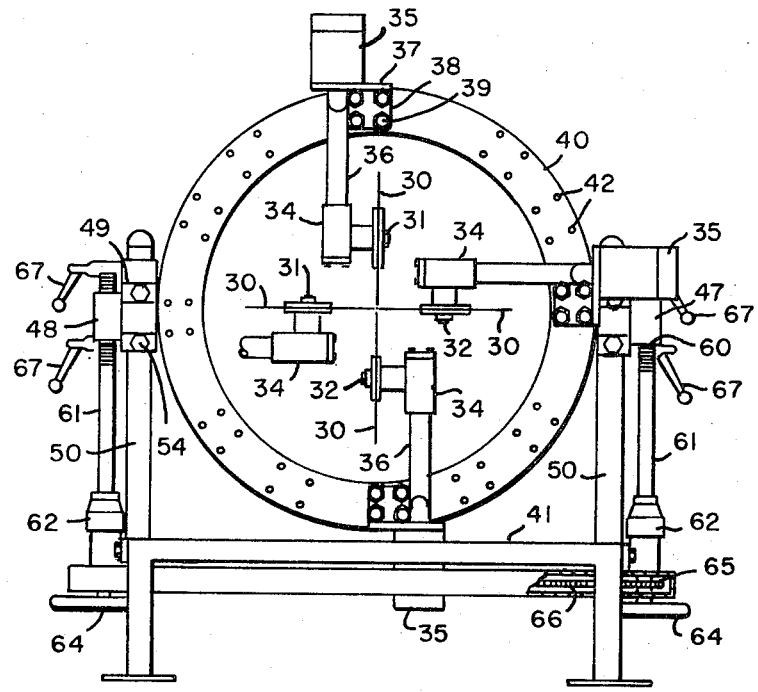
FIG. 2
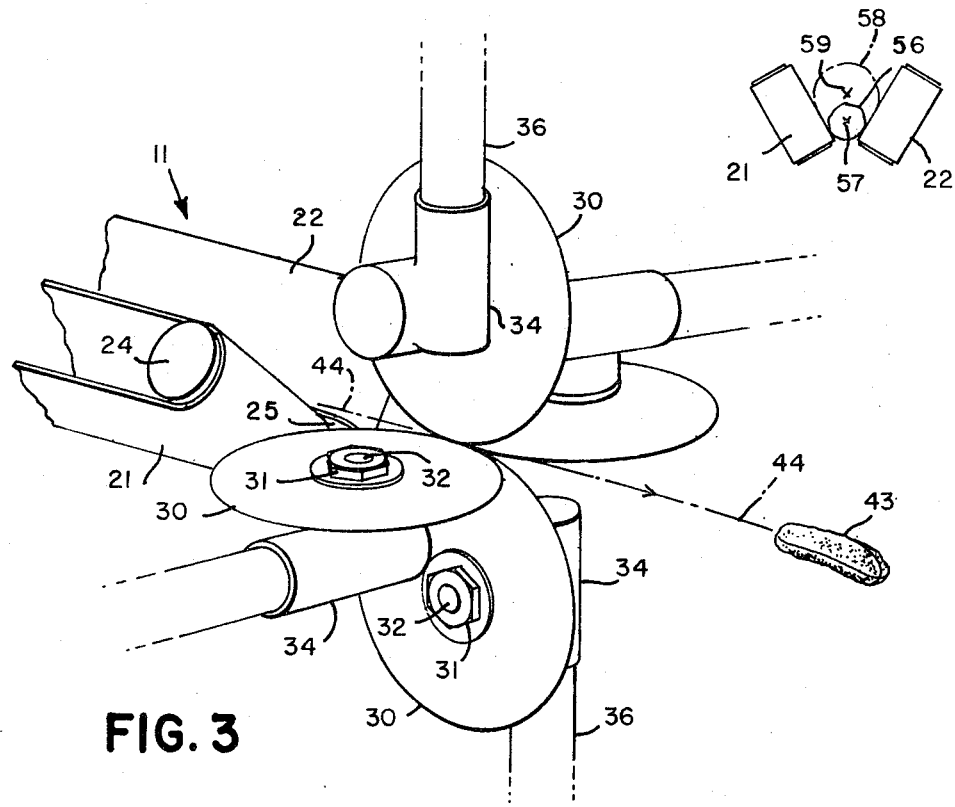
FIG. 3
FIG. 4

ROTARY SLICER FOR FRUITS AND VEGETABLES

BACKGROUND OF THE INVENTION

In rotary slicers, produce is fed into contact with a plurality of radially-spaced power-driven disc blades in a manner to cut each individual article into segments suitable for further processing. Preferably, the segments should be of substantially uniform cross-sectional size and it is for this purpose that the subject invention is provided. It is therefore the primary object of this invention to provide an improved slicing apparatus for fruits and vegetables which is adjustable within a preselected range of adjustments to provide uniformly sized segments of the article of produce.

SUMMARY OF THE INVENTION

A power-driven slicing machine for cutting produce into segments comprising a plurality of power-driven disc blades mounted such that they diverge from a common center line or apex, and means for feeding the produce in singlefile order along a feed line intercepting the common center line such that the produce is cut into segments by the slicing action of the power driven disc blades. The invention includes means to vary the relative positions of the power-driven disc blades and the feeding means so as to alter the relative height and angle between the center line of the blades and the feed line thereby to enable regulation of the configuration of the segments resulting from the sliced articles.

DESCRIPTION OF THE DRAWINGS

FIG. 2 is an end view taken along the line 2—2 of FIG. 1;

FIG. 3 is an enlarged perspective view of the power-driven rotary blades and adjacent feed mechanism, and FIG. 4 is an end view of the conveyor showing various sizes of articles of produce in phantom outline.

DESCRIPTION OF THE INVENTION

Figure 1:
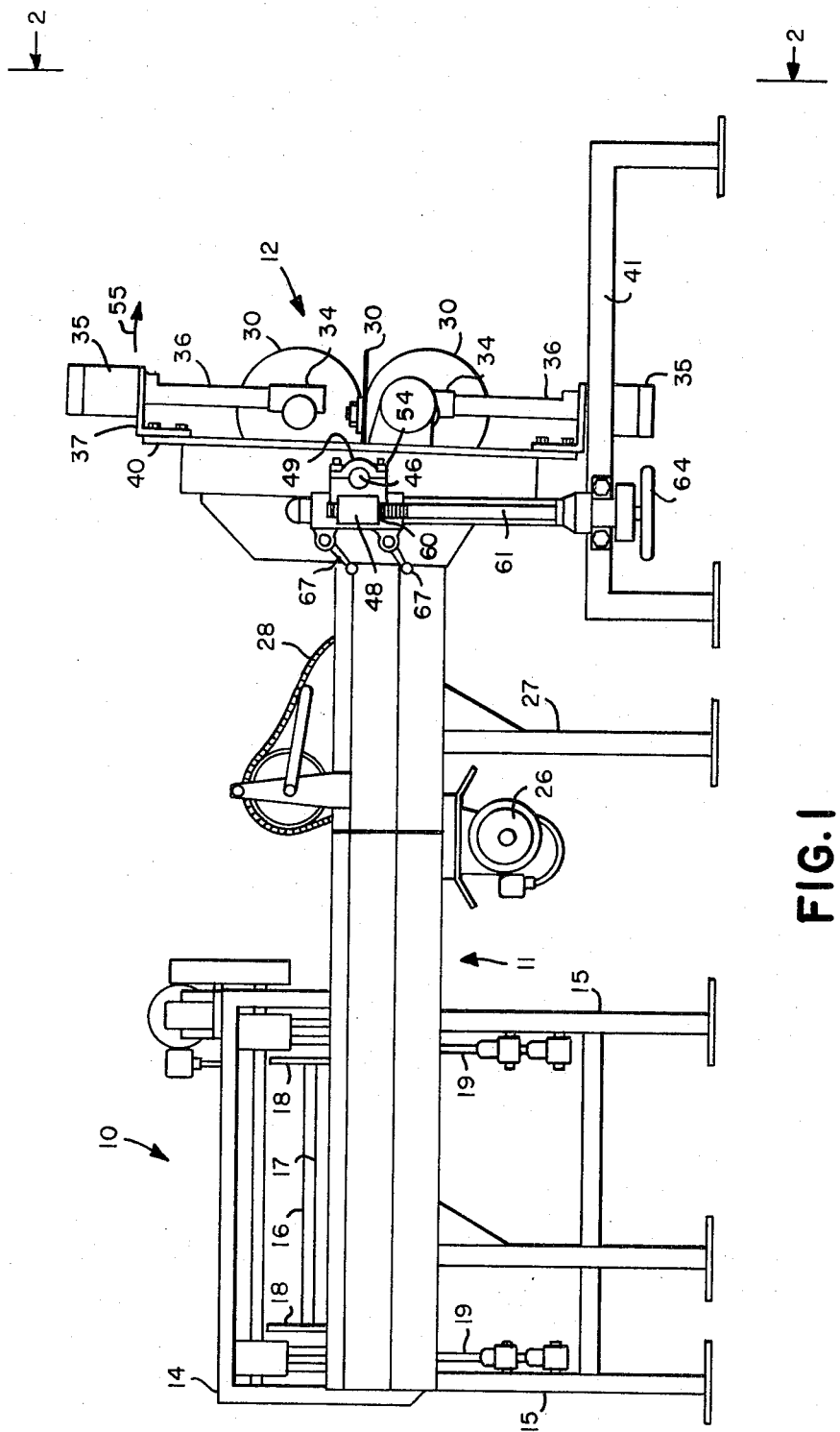
FIG. 1 is a side plan view of the slicing apparatus incorporating the subject invention.

In FIG. 1, is shown a complete apparatus for slicing produce such as fruits and vegetables, comprising a shuffle-feed mechanism 10 positioned adjacent a belt conveyor 11 which extends to a rotary slicing apparatus 12. The shuffle-feeding mechanism receives the produce from a storage bin (not shown) and includes an over head frame 14 mounted on side frame members 15 for supporting therebetween a plurality of moveable sets of alternating shuffle members 16 and 17. The shuffle members are mounted in inclined position, and have a long upwardly facing article supporting portion and a short upwardly facing article advancing and supporting portion. The set of shuffle feed members 16 and 17 each extends between and is secured to opposite frame members 18 which in turn connect with four upwardly extending pivoted links 19 in a manner well-known in the industry, whereby the shuffle members are disposed alternately such that as one set of shuffle members advances in feeding movement, the other set of shuffle members are being retracted. This type of shuffle-feed mechanism is disclosed and more fully described in U.S. Pat. No. 2,792,929, issued on May 21, 1957, to Magnuson Engineers, Inc. It will be understood, however, that the invention is equally applicable to any type of feed mechanism capable of feeding articles in single-file order onto the conveyor 11.

The conveyor 11 comprises a pair of conveyor belts 21 and 22 (FIG. 3) supported between sets of rollers 24 and 25 at an angle of approximately 60° relative to each other. Some of the rollers are power-driven to rotate the belts in unison for advancing the articles from the shuffle-feed mechanism towards the slicing apparatus. An electric motor 26 mounted on the frame 27 of the conveyor is connected to selected roller shafts by a drive belt 28 so as to impart rotary drive motion to the rollers. Thus, the articles are dropped in single-file order from the shuffle-feed apparatus onto the belt conveyor for transport (from left to right in FIG. 1) to the rotary slicer.

As shown in FIGS. 1 and 2, the rotary slicer includes a plurality of power-driven blade assemblies each comprising a disc blade 30 removeably secured by a lock nut 31 to a shaft 32 extending from a gearbox 34. The gearbox is driven by a motor 35 connected thereto by a drive shaft (not shown) extending through the center of a housing 36. Thus, each blade assembly comprises the blade support means as well as the blade driving means.

The disc blades are adapted to cooperate in slicing articles of produce as they are carried into contact with the blade along a line generally parallel to the plane of the blade. For support, each disc blade assembly is fixed to a bracket 37 having a flange 38 extending parallel to the length-wise axis of the motor-gearbox combination and adapted to be bolted onto an annular frame member 40 standing generally vertically (as shown in FIGS. 1 and 2) on a support frame 41. The annular member includes a plurality of bolt holes 42 into which bolts may be passed after passage through the flange 38 in a manner to support the disc blade assembly. By support of the individual disc blade assemblies around the annular member 40, the disc blades are positioned so as to diverge radially outward from a center line and as many as six assemblies can be so mounted at one time for cutting produce into as many as six segments. Thus, as shown in FIG. 3, the product articles 43 pass along a feed line 44 from the conveyor system 11 so as to be intercepted by the power-driven blades and cut into segments.

As shown in FIG. 3, because of the location of the disc blades and the necessity that they come into close proximity to each other at the center line or apex, it is inconvenient if not impossible to support the article being sliced after being contacted by the blades and the cutting action begins. Thus, it is necessary to operate the conveyor at speeds to literally throw the article into the blades. Thereafter, partially because of the previous momentum and partially because of the direction of rotation of the blades, the article is forced on through the blades. However, upon leaving the support of the conveyor, the article naturally follows a downward and forward arcuate path due to the action of gravity. With the blade center line being horizontal, there has resulted the cutting of the article into non-uniform on unequal segments as its path changes with progression through the blades. Naturally, the longer the article of produce, i.e., pickles or carrots, the greater the effect of the non-uniform cut of the produce.

In accordance with one feature of the invention, the disc blade assemblies are mounted in a manner to permit tilting in unison by pivoting of the annular member 40 relative to the supporting frame 41 so as to vary the angular position of the center line of the disc blades relative to a point in the feed line of the conveyor system thereby altering the angle at which the articles of produce enter and leave the cutting region of the blades. By varying the feed angle, the segment configuration can be altered to make them more equal in size and shape, thereby rendering a more uniform produce segment.

For this purpose, and as shown in FIGS. 1 and 2, the annular frame 40 has fixed to opposite sides thereof, a stub shaft 46 extending radially outward in the horizontal direction along an axis intercepting the center line of the disc blades. Each stub shaft fits into a support assembly 47 comprising a sleeve member 48 and a clamping member 49. Each sleeve member in turn encompasses a vertical post 50 mounted on the support frame 41.

The sleeve member and clamping member combine to form a recess 52 into which the associated stub shaft fits. By tightening the bolts 54, the stub shaft is squeezed to hold the annular frame 40 in the position selected. By loosening the bolts, the annular frame can thereafter be tilted from the vertical position thereby altering the angle between the center line of the blades and the stationary feed line of the conveyor 11 in a direction along the feed line.

As pointed out before, the article follows an arcuate path upon leaving the conveyor, thereby resulting in the past in non-uniform cutting of the produce. It has been found that by tilting the annular frame so the center line of the blades more closely follows the downward or arcuate flight of the article, much more uniform cutting of the produce is achieved. Naturally, this adjustment (by movement of the top of the annular frame to the right as illustrated by the arrow 55) varies with the produce being sliced and such adjustment can be made by loosening the bolts 54 and manually adjusting the tilt of the annular frame to fit the immediate needs of the produce articles being sliced.

In accordance with another feature of the invention, the vertical height of the annular frame 40 can be adjusted to accommodate various sized articles of produce. As shown in FIG. 4, the conveyor belts 21 and 22 form an angle of approximately 60° to achieve a pocket in which the produce will lay for advancement to the slicer in the correct position. Naturally, the larger the produce, the higher each article will ride on the conveyor belt and enter the cutting area of the rotary blades. For instance, as shown in the solid outline in FIG. 4, the smaller produce 56 will have a center axis positioned at the point 57, while the larger produce 58, in dotted outline, will have a center axis at point 59. Thus, it can be seen that if it is desired to slice the produce approximately along the center line, such would not happen as the different sized articles are fed through the machine. However, the produce is graded for size prior to slicing, therefore it has been found that there exists the need only to adjust the vertical height of the cutters before each general type or size of the produce is to be sliced thereby altering the center line of the rotary blades to effect uniform slicing of each article.

For this purpose and in accordance with another feature of the invention, the annular frame can be adjusted vertically as shown more fully in FIG. 2. The sleeves 48 which encompass the vertical posts 50 are sized to slide vertically on the post. The sleeve also includes a threaded opening 60 into which fits a threaded shaft 61 extending vertically from the lower frame 41. The shaft 61 is journaled in a bearing 62 fixed to the lower frame and has attached to the end a hand wheel 64. There also is attached to the shaft 61 a sprocket 65 positioned just above the hand wheel and about which extends a chain 66 passing beneath the lower frame and around a similar sprocket on the other vertical shaft 61.

Thus, it can be seen that by turning either hand wheel 64, both shafts 61 are rotated which through the action of the interfitting screw threads of the shaft and sleeve member, the position of the support assembly 47 is adjusted in a vertical direction along the support post 50. Cranks 67 which are threaded through the sleeve member can thereafter be tightened when the desired vertical adjustment is reached to hold the support assembly and supported annular frame in the selected vertical position. Thus, it can be seen that an operator positioned on either side of the conveyor can adjust the vertical height of the rotary cutters to accommodate articles of produce of various sizes as the need arises while in operation.

I claim:

1. A power-driven slicing machine for cutting produce into segments, comprising:

a plurality of power-driven disc blade assemblies each mounted for rotation and adapted to slice produce;

means supporting said disc blade assemblies such that they diverge from a common center line radially outward;

means for feeding the produce in single-file order along a feed line intercepting said common center line such that the produce is cut into segments by the slicing action of the power-driven disc blades, and means to vary the relative positions of the power-driven disc blade assemblies and the feeding means so as to alter the angle between the center line and the feed line thereby to change the configuration of the segments resulting from the slicing of the produce.

2. A power-driven slicing machine as defined in claim 1 wherein the supporting means comprises an annular member including means for fixing the power-driven disc blade assemblies at various positions thereabout.

3. A power-driven slicing machine as defined in claim 1 including means for adjusting the relative vertical positioning of the disc blade assembly support means and the feeding means.

4. A power-driven slicing machine as defined in claim 2 including means for adjusting the relative vertical positioning of the disc blade assembly support means and the feeding means.

5. A power-driven slicing machine as defined in claim 4 wherein said annular member is supported on one axis intercepting the common center line and said means to vary the relative positions of the blade assemblies and feeding means includes means to pivot the annular member about said axis.

6. A power-driven slicing machine as defined in claim 5 including means for adjusting the relative vertical positioning of the disc blade assembly support means and the feeding means.

7. A power driven slicing machine for cutting articles of produce into segments, comprising:
   means for feeding the produce along a feed line;
   a plurality of power-driven disc blades;
   means supporting the disc blades at a point along the feed line so the blades will intercept and cut the produce into segments as the articles are advanced along the feed line and into contact with the blades, and
   means to pivot the support means for the disc blades angularly along the direction of the feed line and about the feed line point thereby to change the configuration of the segments resulting from the slicing of the produce.

* * * * *